United States Patent [19]

Israel

[11] 4,293,292

[45] Oct. 6, 1981

[54] CANDY FLOSS MACHINE

[75] Inventor: Benjamin Israel, Bensalem Township, Bucks County, Pa.

[73] Assignee: North Eastern Timber (U.S.A.) Incorporated, Camden, N.J.

[21] Appl. No.: 95,831

[22] Filed: Nov. 19, 1979

[51] Int. Cl.³ ............................................. A23G 3/20
[52] U.S. Cl. .................................. 425/9; 425/126 S; 425/135; 425/144
[58] Field of Search ................. 425/9, 135, 126 S, 144

[56] References Cited

U.S. PATENT DOCUMENTS

| | | | |
|---|---|---|---|
| 2,058,637 | 10/1936 | Scott et al. | 312/97.1 |
| 2,654,505 | 10/1953 | Fuhrman | 222/2 |
| 3,075,480 | 1/1963 | Berg | 222/2 |
| 3,125,967 | 3/1964 | Bowe | 425/9 |
| 3,203,365 | 8/1965 | Bowe et al. | 425/9 |
| 3,829,262 | 8/1974 | Aquarius | 425/126 S |
| 3,856,443 | 12/1974 | Salvi | 425/9 |
| 3,930,043 | 12/1975 | Warning | 426/515 |
| 3,951,303 | 4/1976 | Hobden | 222/96 |

FOREIGN PATENT DOCUMENTS

2004412 12/1970 Fed. Rep. of Germany .
2248792 5/1975 France .

*Primary Examiner*—James H. Derrington
*Attorney, Agent, or Firm*—Seidel, Gonda, Goldhammer & Panitch

[57] ABSTRACT

Plural sticks for collecting candy floss are stored in a removable annular storage facility. The sticks are automatically dispensed, one at a time, from the storage facility. A dispensed stick is retained in a collar and sleeve arrangement. A mechanism permits relative rotation between the collar and sleeve to insure proper alignment and reception of the stick. The collar and sleeve arrangement clamps and rotates the stick about its own axis. A rotary head for producing floss is rotated as the stick is rotated. A rotary drum surrounding the head sweeps the floss towards the stick. During the machine cycle, heat is applied to the head to enable the head to produce the floss. When the application of heat to the head ceases, the head, drum and stick continue to be rotated for a "run-off" period of time. During the "run-off" time, floss which would otherwise accumulate in the machine is spun off and collected by the stick. The rate at which heat is initially applied to the head is adjustable. Following initial application of heat to the head, the head temperature is maintained at a predetermined adjustable level until heat is no longer applied to the head. The total amount of heat supplied to the head is controlled in response to the initial temperature of the head.

15 Claims, 12 Drawing Figures

CANDY FLOSS MACHINE

BACKGROUND OF THE INVENTION

The invention is directed to an improved candy floss machine. Coin-operated candy floss machines are well known. For example, see U.S. Pat. No. 3,856,443 (Salvi) and French Pat. No. 2,248,792 (General Properties Anstalt). In these machines, a charge of sugar is dumped in a rotary head. The head is provided with a heating element. When the element is energized, heat is generated within the head. As the head spins, candy filaments or floss are ejected through orifices in the head wall.

In the machine described in U.S. Pat. No. 3,856,443 (Salvi), sticks are stored in a reservoir. A mechanism dispenses a stick for use by the customer. The customer inserts the stick in the machine through an opening in the front of the machine casing to collect the floss being spun out by the rotating head. Excess floss is collected in a rotary trough surrounding the head.

In a machine of the type described in French Pat. No. 2,248,792 (General Properties Anstalt), a mechanism is provided for automatically dispensing a stick from a magazine to a location proximal to the rotary head. Candy floss ejected by the head is collected by the stick. The stick is rotated to assist in collecting the floss. The head is surrounded by a rotary drum. The drum deflects floss spun out by the head and sweeps the floss to the stick. At the end of a machine cycle, the stick and floss is dropped into a receptacle where it can be retrieved by the customer.

The sticks are stored in the magazine in a filar or straight line arrangement. The file of sticks is spring-urged towards a stop. A motor operated plunger forces a stick out of the magazine towards a pair of rollers and a collar and sleeve arrangement disposed below the magazine. One of the rollers is motor driven while the other is a spring-urged idler roller. The stick enters the nip between the rollers, spreading the rollers, and is driven by the rollers towards the collar and sleeve arrangement. The collar is seated on the sleeve and is provided with a central opening having a cross-section similar to the cross-section of the stick. The collar comprises two facing segments. One segment is bolted to the sleeve. The other segment is freely mounted on the sleeve. This segment may be spread from the bolted segment by a stick entering the central opening of the collar.

The collar segments are urged towards each other by means of resilient washers, insuring that the segments clamp the stick in position in the collar. The collar is rotated by a friction drive with the stick retained therein. Thus, the stick rotates about its own axis within the rotating collar. As the stick rotates, it collects floss which is spun out by the rotary head. At the end of a machine cycle, heat supply to the head ceases, and a new stick is moved out of the magazine towards the collar. The new stick enters the nip between the rollers and is driven by the rollers into contact with the top of the stick which is clamped in the collar. The latter stick, with floss collected thereon, is ejected from the collar and drops towards the receptacle.

Various difficulties have been encountered in operating such machines. For example, the filar storage magazine severely limits the number of sticks which may be stored in the machine. In addition, when the magazine is fully loaded unequal forces develop on the first and last sticks in the file. If the sticks are not uniform in dimensions and strength, broader sticks towards the front of the magazine may at times not be dispensed at all; and narrower sticks towards the rear of the magazine may be dispensed two sticks at a time.

In addition, the filar arrangement provides support for the stopped sticks only in respect to the fore and aft faces. When the stick is being ejected from the stick dispenser, the stick may bow at the two unsupported faces. Under stress of the plunger mechanism, the stick may break.

Further, the rollers which drive the stick towards the collar are normally in contact, grinding against each other before being spread apart by a descending stick. This results in objectionable wear of the rollers.

Difficulty may also be experienced in aligning a stick with the collar opening. Thus, the stick is driven by the rollers towards the collar as the collar is rotating. As the stick reaches the mouth of the rotating collar opening, it may not be able to align with and enter the opening. Moreover, even if the stick is aligned in the collar, it is being rotated with the collar while it is being driven downwardly by the rollers. Thus, the stick may be twisted and the stick edges shaved or splintered by the rollers.

It has also been found that floss accumulates in clusters on the drum surrounding the rotary head if the plunger mechanism is activated to force the stick out of the collar immediately when the heat supply to the head is cut off. This is due to the production of residual floss by the rotating head as the head cools. The floss is spun out towards the drum but is not collected by the stick, as the stick is no longer in position to collect floss.

An advantage of the present invention is that the stick storage space within the machine is optimally utilized by providing an annular storage region.

Another advantage of the invention is that uniform forces are applied to the stored sticks and the stored sticks are supported on all four faces when in position to be dispensed to ensure reliable dispensing of the sticks one at a time.

A further advantage of the invention is that the rollers which drive a stick towards the collar and sleeve arrangement are maintained in spaced apart relation so that grinding and wear of the rollers is eliminated.

A still further advantage of the invention is that the collar and sleeve arrangement is provided with a loss of motion mechanism which permits rotary movement of the collar relative to the sleeve to insure that the stick aligns properly in the collar opening.

Another advantage of the invention is that the rotary drive for the collar is applied after the stick is released by the rollers, thus avoiding twisting of the stick.

Yet a further advantage of the invention is that the rotary drive to the drum surrounding the rotary head is not removed and the plunger mechanism is not activated immediately when the heat supply is cut out, thereby enabling the stick to remain in position in the collar to collect any excess or residual floss, preventing clusters of floss from forming on the drum.

An additional advantage of the invention is that the rate at which heat is initially applied to the head heater element may be varied, thereby enabling rapid reliable operation in all temperature environments.

Yet an additional advantage is that the length of the heating cycle, hence the total amount of heat supplied to the head, is variable depending on the initial temperature of the head.

Another advantage of the invention is that the temperature of the head may be maintained at a predetermined level (which may be pre-adjusted) after initial application of heat to the head.

Other advantages appear hereinafter.

BRIEF SUMMARY OF THE INVENTION

In a candy floss machine for dispensing candy floss on a stick, an annular storage region is provided within which one or more sticks are stored. The sticks are urged towards a preselected location. A stick entering the preselected location is ejected from the storage region. The stick is driven by a pair of rollers towards a collar and sleeve arrangement. The collar is provided with an opening for receiving the stick. The collar and sleeve arrangement is provided with means for automatically aligning the stick in the collar opening. To avoid twisting of the stick, the collar and sleeve arrangement is rotatably driven after the stick is first released by the rollers. When the collar and sleeve arrangement is driven, the stick rotates about its own axis. At the same time, a rotary head is driven to produce the floss, and a rotary drum surrounding the head is also driven to sweep the floss to the stick. During this time, heat is supplied to a heater element in the head. When the heat supply is cut off, the drum continues to be driven and the stick remains in the rotating collar to clear all floss from the drum. The rate at which heat is initially supplied to the head is variable and the total amount of heat supplied to the head is based upon the initial head temperature.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1A:
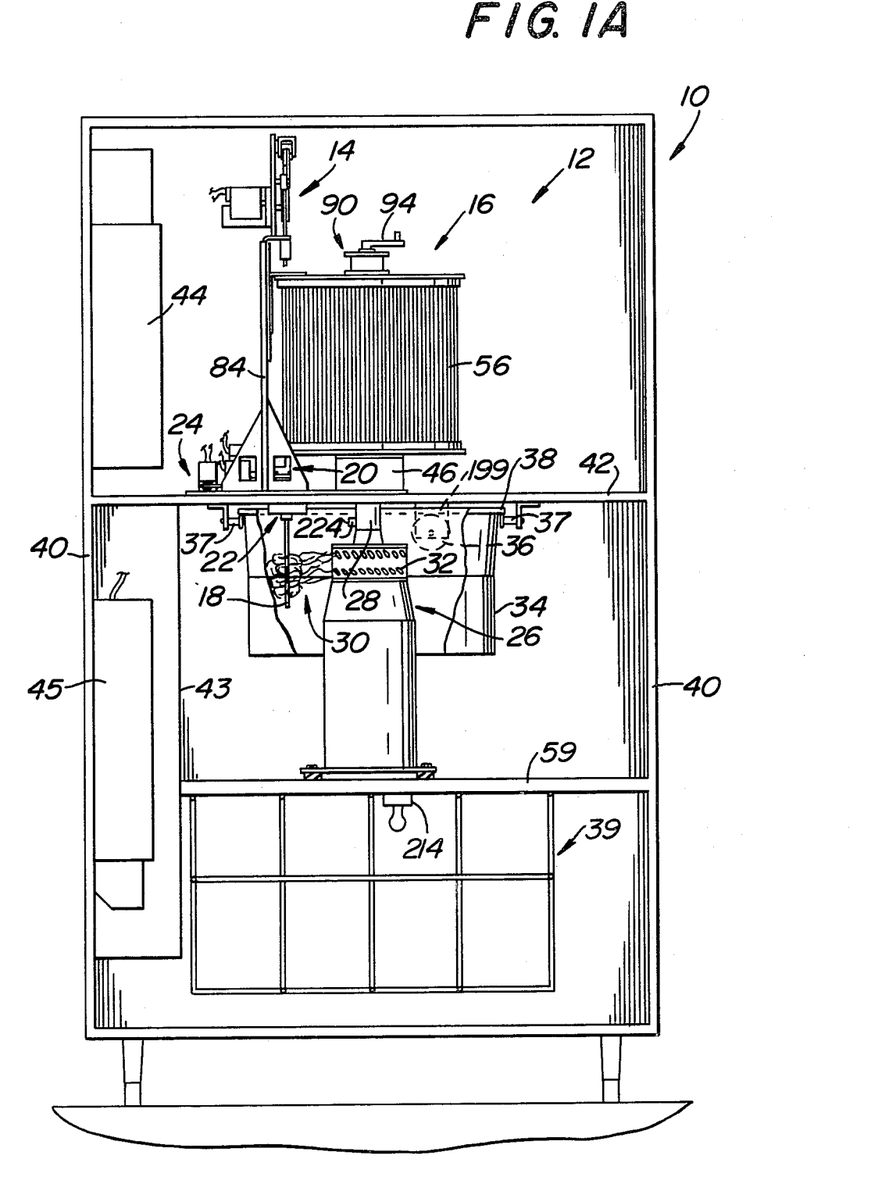
FIG. 1A is a front elevation of the interior of the improved candy floss machine of the present invention.

Referring to the drawings wherein like numerals indicate like elements, there is shown in FIG. 1A an improved candy floss machine 10 in accordance with the present invention. The machine includes an automatic stick dispenser 12 comprising a plunger mechanism 14 and an annular storage facility 16. Sticks are stored in the annular storage facility 16 and dispensed, one at a time, by the plunger mechanism 14.

A stick 18 is ejected by plunger mechanism 14 from storage facility 16 and enters the nip of a roller arrangement 20. The stick 18 is driven by the roller arrangement 20 towards a collar and sleeve arrangement 22. The stick is aligned with and enters the collar and sleeve arrangement. The stick is held by the collar and sleeve arrangement 22 as the collar and sleeve arrangement is rotatively driven by a motor and belt drive 24. The stick rotates about its own axis at a location spaced apart from a rotary head 26 which contains a heater element (not shown). The rotary head 26 is part of a conventional unit for producing candy floss from sugar. The unit includes a drive motor for rotating the head.

A charge of sugar is dumped into the head 26 through a chute 28 from a sugar dispenser (not shown). A heat sensor 224 is mounted on the chute 28 near the head 26 for purposes described more fully hereinafter. As the head rotates, it is heated by the heater element and spins out a floss 30 through the head orifices 32. The head 26 is surrounded by a rotary drum 34 which is driven by a motor 199 and friction wheel drive 36 (shown in phantom). The drum 34 is provided with a flange 38 which rests on the wheel drive 36 and supporting idler rollers 37. The drum 34 deflects the floss spun out by the head 26 and sweeps the floss towards the rotating stick 18. During the machine cycle, the floss collects on the stick 18.

At the end of the machine cycle, the plunger mechanism 14 ejects another stick from the storage facility 16. The new stick is guided by the roller arrangement 20 towards the collar and sleeve arrangement 22 where it contacts the stick 18 and forces the stick 18 out of the collar and sleeve arrangement. The stick 18, with the floss collected thereon, drops through the drum 34 into a basket 39.

The foregoing components of the machine 10 are housed within a shell 40 having a partition 42. An electronic timing and control unit 44 is mounted on the shell above the partition 42. The storage facility 16 is mounted above partition 42 on a support bracket 46 fixed to the partition. The rotary head 26, rotary drum 34 and a coin mechanism 45 are disposed below the partition 42. Floss produced by head 26 is prevented by partition 42 from entering the space above the partition and fouling the elements mounted above the partition. The coin mechanism 45 is secured to shell 40 and is protected by a casing 43 bolted to partition 42 and shell 40. The casing 43 prevents floss from entering the space occupied by the coin mechanism 45 and fouling the coin mechanism.

Figure 1B:
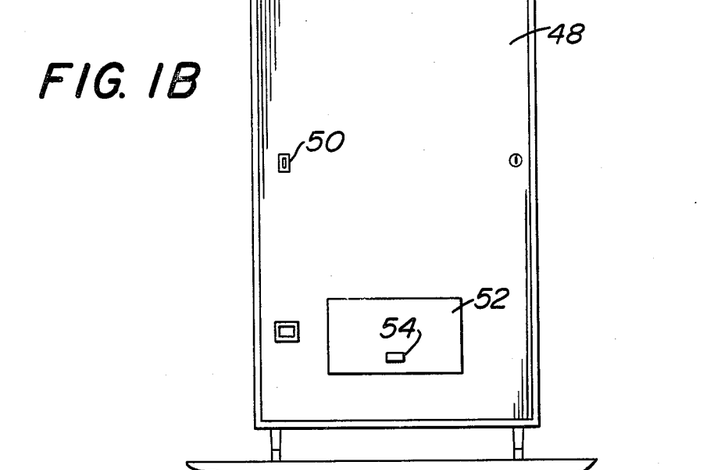
FIG. 1B is a front elevation of the exterior of the improved candy floss machine.

Referring to FIG. 1B, a door 48 hinged to shell 40 is provided with a coin receptacle 50 and a vertically reciprocable gate 52 having a handle 54. Preferably, gate 52 is transparent and is located near the bottom of the door 48. The basket 39 is located behind the gate. The gate is pulled upwardly by the customer at the end of the machine cycle to retrieve the stick and floss deposited in the basket 38. The gate is locked by means of a switch operated solenoid (not shown) during the machine cycle and is released by the solenoid so that it can be lifted by the customer at the end of the machine cycle.

ANNULAR STORAGE FACILITY 16

Figure 2A:
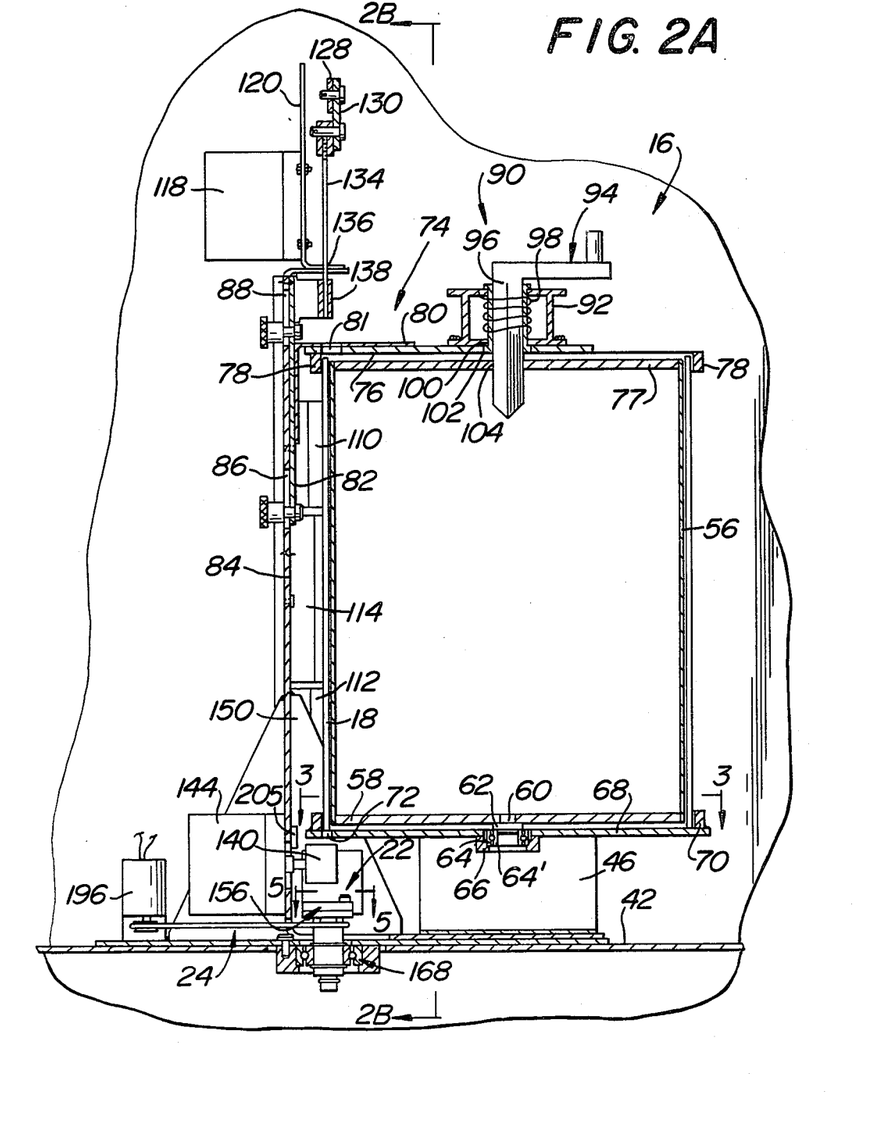
FIG. 2A is a cross-section of the annular storage facility and roller arrangement.
Figure 2B:
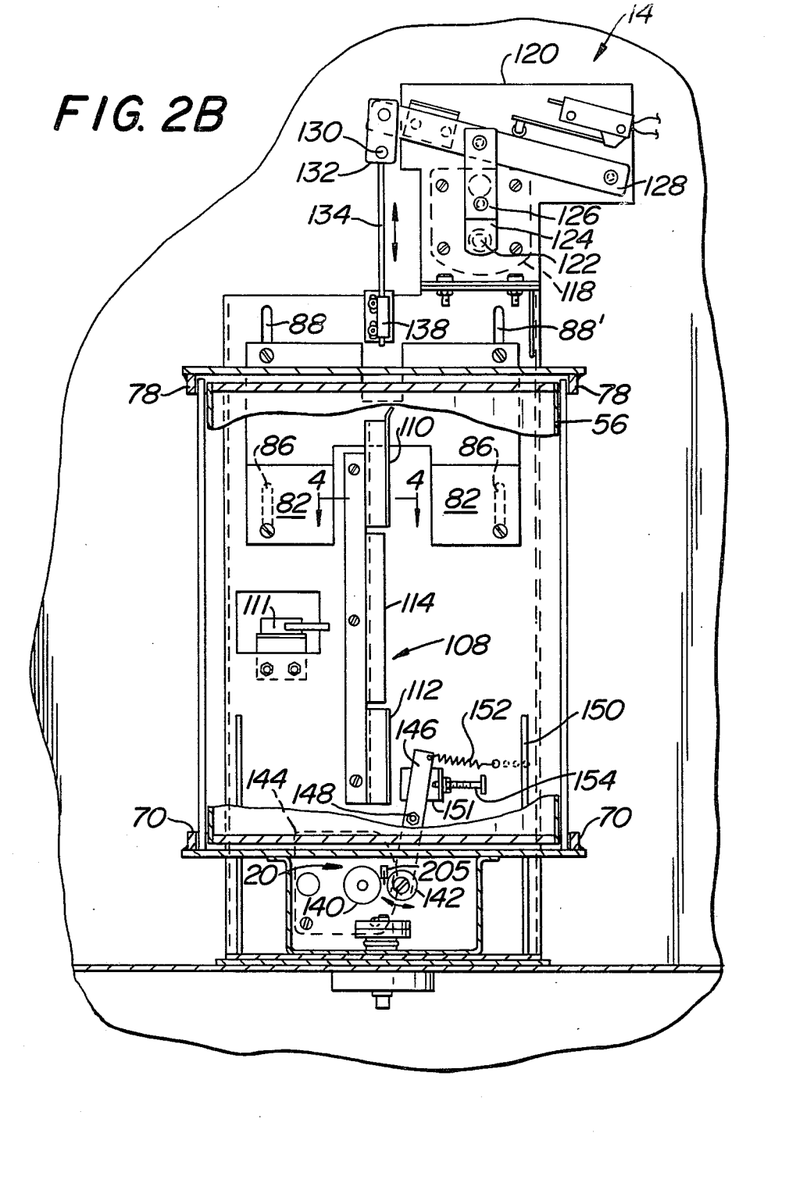
FIG. 2B is a cross-section taken along lines 2B—2B in FIG. 2A.

Referring to FIGS. 2A and 2B, the annular storage facility 16 includes a rotary drum 56. The base 58 of drum 56 is provided with a pin 60 having a disc-like portion 62 which rests on a pair of annular roller bearing segments 64, 64'. Bearing segment 64 is mounted on an annular support 66 secured to the underside of a circular table 68. Bearing segment 64' supports the circular pin 60.

The table 68 is bolted to the support bracket 46 mounted on partition 42. A ring or annular flange 70 is secured to the topside of the table 68. The ring 70 is spaced apart from the annular wall of drum 56. A circular opening 72 having a diameter slightly greater than the largest crosssectional dimension of a stick 18 is located in the region between the flange 70 and the wall of drum 56. The cross-section of the stick 18 is generally rectangular or square.

A cover 74 for the drum 56 comprises a plate 76 which partially covers the top of the drum 56 and a ring 78 secured to the underside of plate 76. Ring 78 is spaced apart from the wall of the drum 56. The plate 76 is secured to an angle bracket 80. An opening 81 is provided in the bracket 80 and the plate 76 to accomodate the passage of a plunger rod 134 as described hereinafter. The bracket 80 is secured to a plate 82 which is bolted to a slotted support wall 84 at lower slots 86, 86' and upper slots 88, 88'. This permits the bracket 80 and cover 74 to be displaced vertically with respect to the drum 56.

Power for the drum 56 is provided by a spring mechanism 90. The spring mechanism 90 includes a casing 92 bolted to the plate 76. A handle 94 is inserted and rotated in the casing 92 to wind the mechanism. The handle 94 includes a stem 96 which fits within a bushing 98 seated in the casing 92. The bushing 98 has a square-shaped interior channel for receiving the stem 96. The stem 96 fits snugly within the bushing 98. The bushing 98 passes through circular opening 100 in the bottom of casing 92. The stem 96 extends through a circular opening 102 in plate 76 and protrudes through a square-shaped opening 104 in top plate 77.

A spring 105 is coupled to the bushing 98 and an interior wall of casing 92. The handle 94 is rotated to wind the spring. Preferably, this is done after first loosening the bolts which secure plate 82 to slotted support wall 84 and raising the bracket 80 and spring mechanism 90 above the drum 56 so that the stem 96 is free of the drum. The spring 105 is then wound by rotating the handle 94. The bracket 80 is then moved downwardly so that the stem 96 enters opening 104. As spring 105 unwinds, the stem 96 rotates, turning the drum 56.

Figure 3:
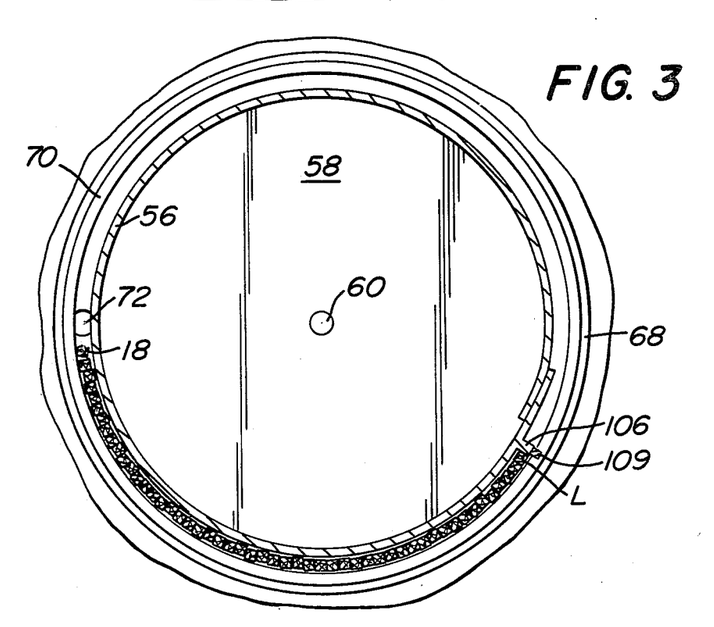
FIG. 3 is a cross-section taken along lines 3—3 in FIG. 2A.

The sticks are stored in the annular region defined by the rings or flanges 70 and 78 and the wall of drum 56. The wall of drum 56 is provided with a vertical rib 106. See FIGS. 3 and 4. The rib 106 contacts the last stick, designated L, urging the annular arrangement of sticks towards the opening 72. When a stick is aligned with the opening 72, it is in position to be ejected from the storage facility.

Figure 4:
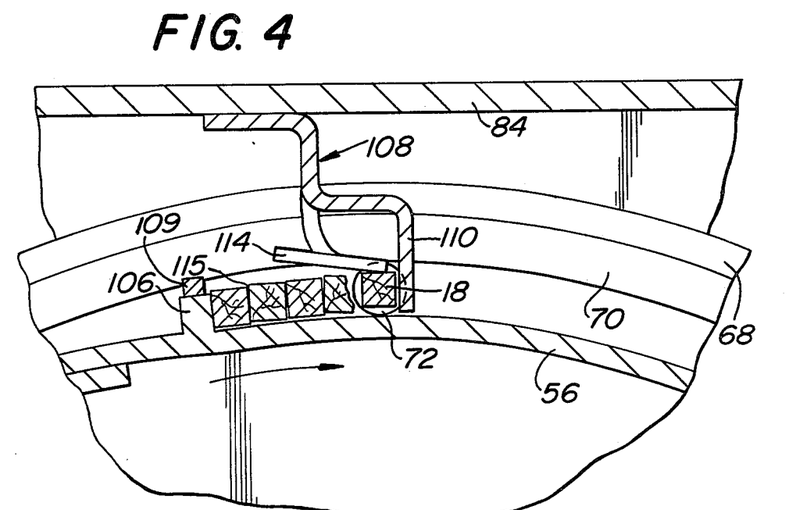
FIG. 4 is a cross-section taken along lines 4—4 in FIG. 2B.

As shown in FIG. 4, the sticks are retained between the drum wall and the rings 70, 78 in such a manner as to produce a small gap 115 between a portion of the opposing faces of adjacent sticks. This reduces the surface contact between a stick being dispensed from the storage facility and the next stick in line, facilitating the dispensing process.

It should be appreciated that the storage facility can be rapidly and easily re-loaded with sticks by merely inserting the sticks through the space between plate 76 and ring 78 into the region along the wall of drum 56 between rings 78 and 70. The drum 56 need not be removed in order to reload the facility with sticks. However, if desired a spare drum loaded with sticks may be maintained and substituted for an exhausted drum by simply removing the exhausted drum and replacing it with the spare drum.

EJECTION OF A STICK FROM STORAGE FACILITY 16

Under power of spring mechanism 90, sticks in the annular storage region are urged towards opening 72 in the circular table 68. A flanged stop 108 is mounted on the support wall 84 to support the stick and to maintain the stick in alignment with the hole 72. See FIG. 2B and 4. The flanged stop 108 comprises upper and lower vertically aligned right angle stops 110, 112. Intermediate the upper and lower stops 110, 112 of stop 108 is a guide 114. The guide 114 wedges a stick approaching hole 72 against the wall of drum 56. See FIG. 4. The stops 110 and 112 and the guide 114 therefore retain the stick in position over the whole 72 while supporting all four faces of the stick. More specifically, guide 114 and the drum wall support one pair of opposing stick faces while stops 110 and 112 and the stick next in line support the other pair of opposing stick faces. This prevents bending or bowing of the stick as the stick is ejected from the storage facility 16.

The stick is ejected automatically from the storage facility by means of the motor driven plunger mechanism 14. See FIG. 2B. The mechanism is driven by a motor 118 mounted on a bracket 120 bolted to a shelf portion of support wall 84. The motor 118 has a shaft 122 which rotates a link 124 secured thereto. Link 124 is pivotably coupled to a link 126. Link 126 is in turn pivotably coupled to a lever 128. The lever 128 is pivotably coupled at one end to the bracket 120. At its other end, the link 128 is pivotably coupled to a link 130. The link 130 is in turn pivotably coupled to a link 132. Link 132 is provided with a threaded bore in which a plunger 134 is threadedly engaged. The plunger 134 extends through a sleeve 138 secured to the support wall 84.

During the first half revolution of the motor shaft 122, the lever 128 is rotated counter-clockwise, and the plunger 134 travels downwardly, through the sleeve 138, into contact with the stick 18 which is aligned with the opening 72 in table 68. See FIGS. 2A and 2B. The plunger 134 contacts the top of the stick 18 and forces the stick through opening 72. The stick travels downwardly through opening 72 to the nip of roller arrangement 20 comprising motor driven roller 140 and idler roller 142. See FIG. 2B. The roller 140 is driven by a motor 144 fastened to the support wall 84. Roller 140 may have a corrugated rubber surface for enhanced contact with the stick.

Roller 142 is mounted on a pivotable arm 146 which is rotatably mounted on the support wall 84 at pivot point 148. The distal end of the arm 146 is spring-coupled to a gusset 150 by means of spring 152. An adjustable screw member 154 threadedly coupled to a bracket 151 secured to wall 84 bears up against the distal portion of the arm 146. The position of the arm 146 and idler roller 142 relative to motor driven roller 140 can be adjusted by adjustment of screw member 154. The position of the arm 146 is adjusted so that a gap exists between rollers 140 and 142. Thus, the rollers are not in contact and do not grind against each other when no stick is present. The gap is sufficiently small to insure that a stick entering the nip between the rollers will spread roller 142 from roller 140. Accordingly, roller 140 drives the stick downwardly, with good frictional contact between the stick and the rollers 140 and 142. The stick travels downwardly towards the collar and sleeve arrangement 22.

A switch 205 is mounted on wall 84 slightly above the elevation of rollers 140, 142. As described more fully hereinafter, the switch ensures that a stick will always be in (serving) position in the collar and sleeve arrangement before a machine cycle begins.

COLLAR AND SLEEVE ARRANGEMENT 22

The collar and sleeve arrangement 22 includes a split collar 156 having a central opening 158 defined by collar segments 160, 162. See FIG. 6. The collar segments are held together by means of resilient O-ring 164. Collar segments 160, 162 are seated in a sleeve 166. Sleeve 166 is driven by the motor and belt drive 24. A ball bearing segment 168' is supported by an annular housing 167 bolted to the underside of a plate 169 secured to partition 42. The sleeve 166 is secured by washers to ball bearing segment 168. The sleeve 166 extends through opening 171 in plate 169 and the housing opening 173. The sleeve rotates under power of the drive 24.

When the stick 18 enters the mouth of central opening 158, the stick may not be aligned with the opening 158. See FIG. 5. Accordingly, a loss of motion mechanism is provided whereby the collar 156 is permitted to rotate relative to the sleeve 166 to bring the stick 18 and opening 158 into alignment. This occurs while the stick is being driven into the collar by rollers 140, 142 and before drive 24 operates to drive the collar and sleeve. The loss of motion mechanism includes an arcuate slot 170 in collar segment 162 and a post 172 secured to the sleeve 166. When the stick 18 enters the mouth of collar opening 158, the stick contacts the split collar segments 160, 162, spreading the segments and causing the segments to rotate together relative to the sleeve 166. In addition, the pin 172 and slot 170 cooperate to spread the collar segments 160, 162 to accomodate passage of the sticks in opening 158. As the segments 160, 162 rotate with respect to sleeve 166, the opening 158 rotates into alignment with the descending stick. During this time, drive 24 is not operative and the stick is driven through opening 158 by roller arrangement 20.

Figures 5, 6:
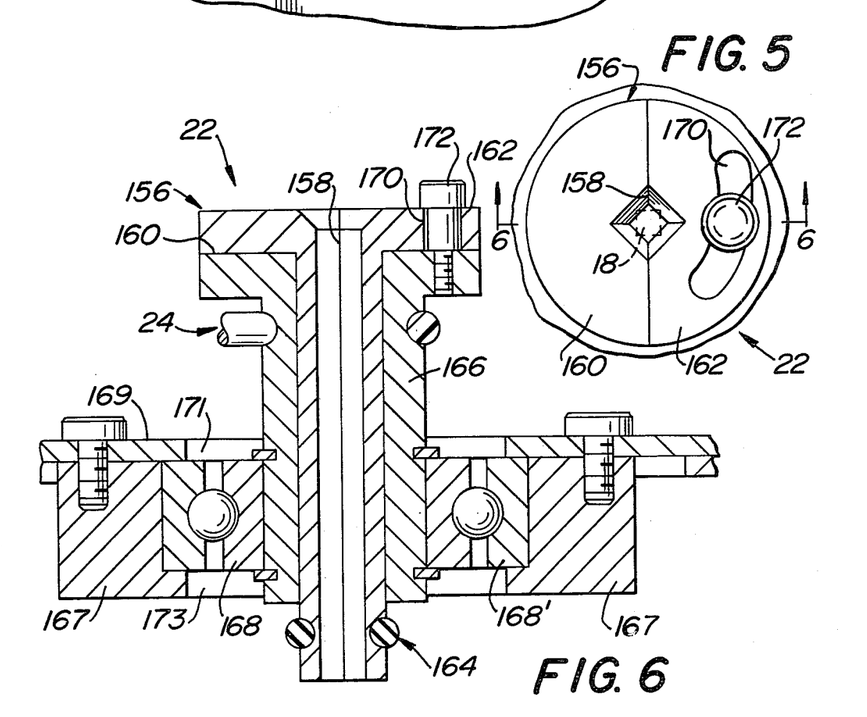
FIG. 5 is a view taken along lines 5—5 in FIG. 2A.
FIG. 6 is an enlarged cross-section taken along 6—6 in FIG. 5.

When the stick is released by roller arrangement 20, drive 24 starts to rotate collar and sleeve arrangement 22, the end of the arcuate slot 170 contacts post 172, and the collar segments 160, 162 and the sleeve 166 rotate together at approximately 200 rpm under power of the drive 24. As the collar and sleeve arrangement 24 rotates, the stick is clamped in place by the collar segments 160, 162, and the stick rotates about its own axis at approximately 200 rpm. This assists in collecting the floss spun out by head 26.

TIMING AND CONTROLS

Figure 7A:
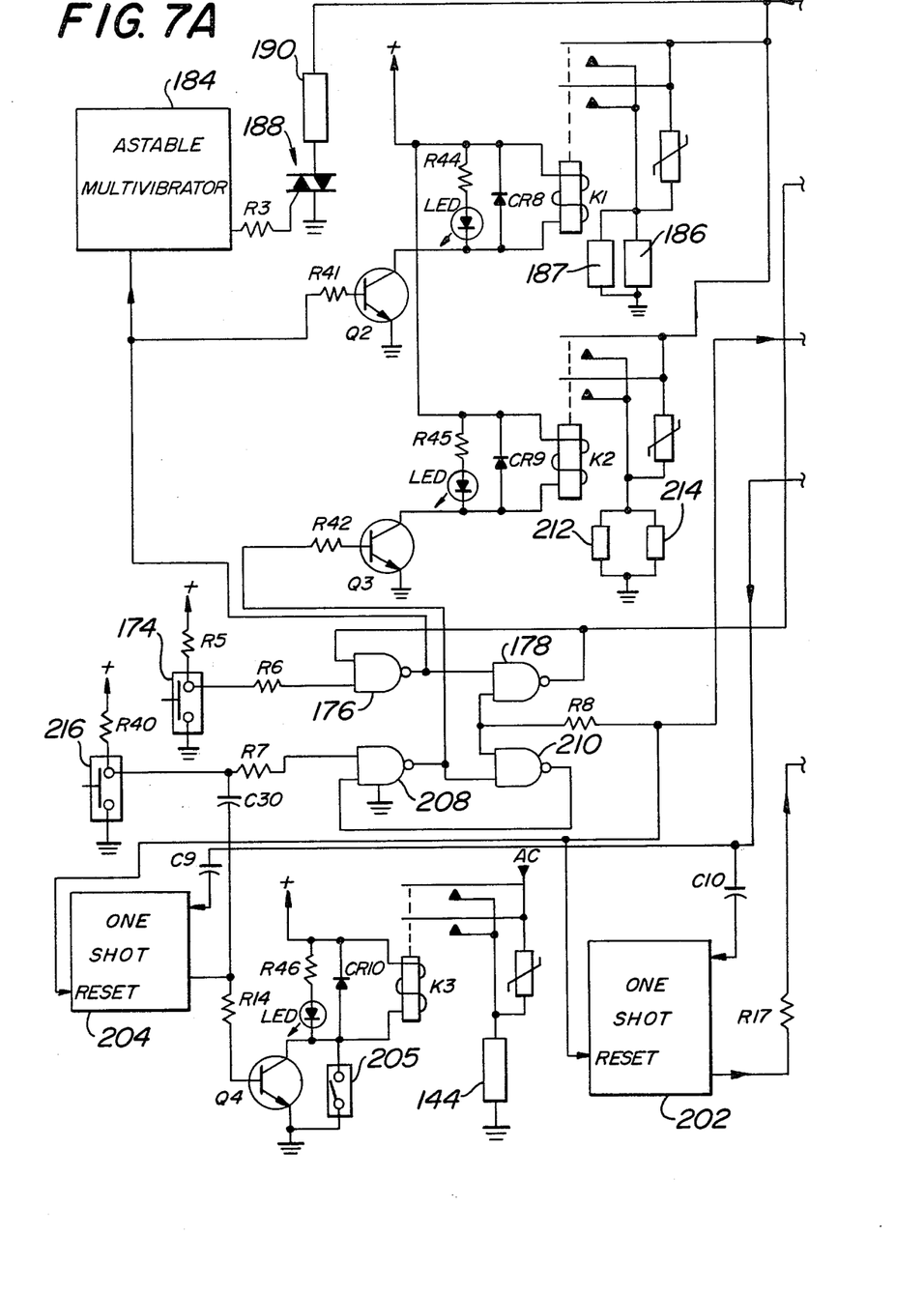
FIGS. 7A, 7B and 7C comprise an electrical schematic of the timing and heat controls of the present invention.
Figure 7B:
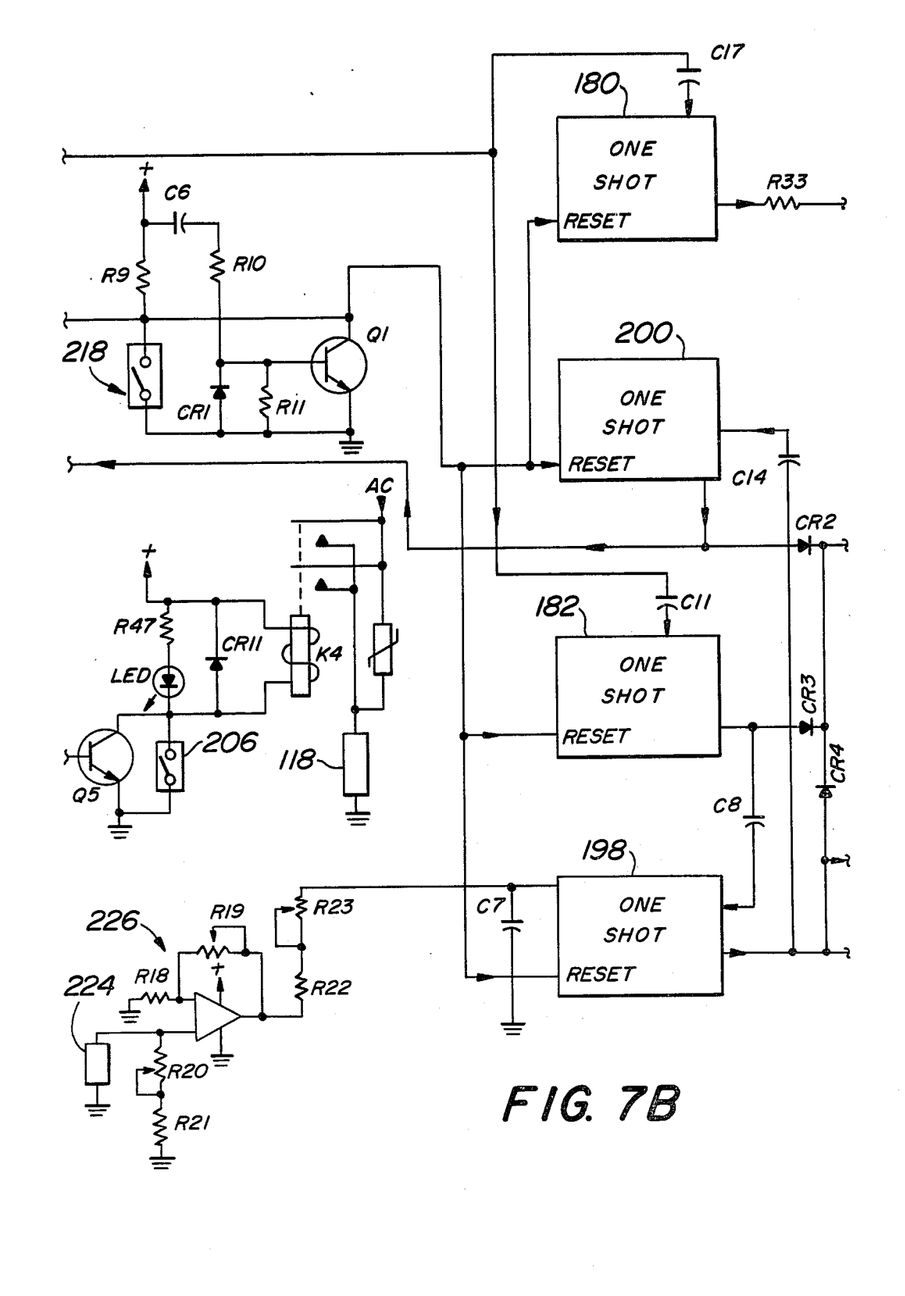
Figure 7C:
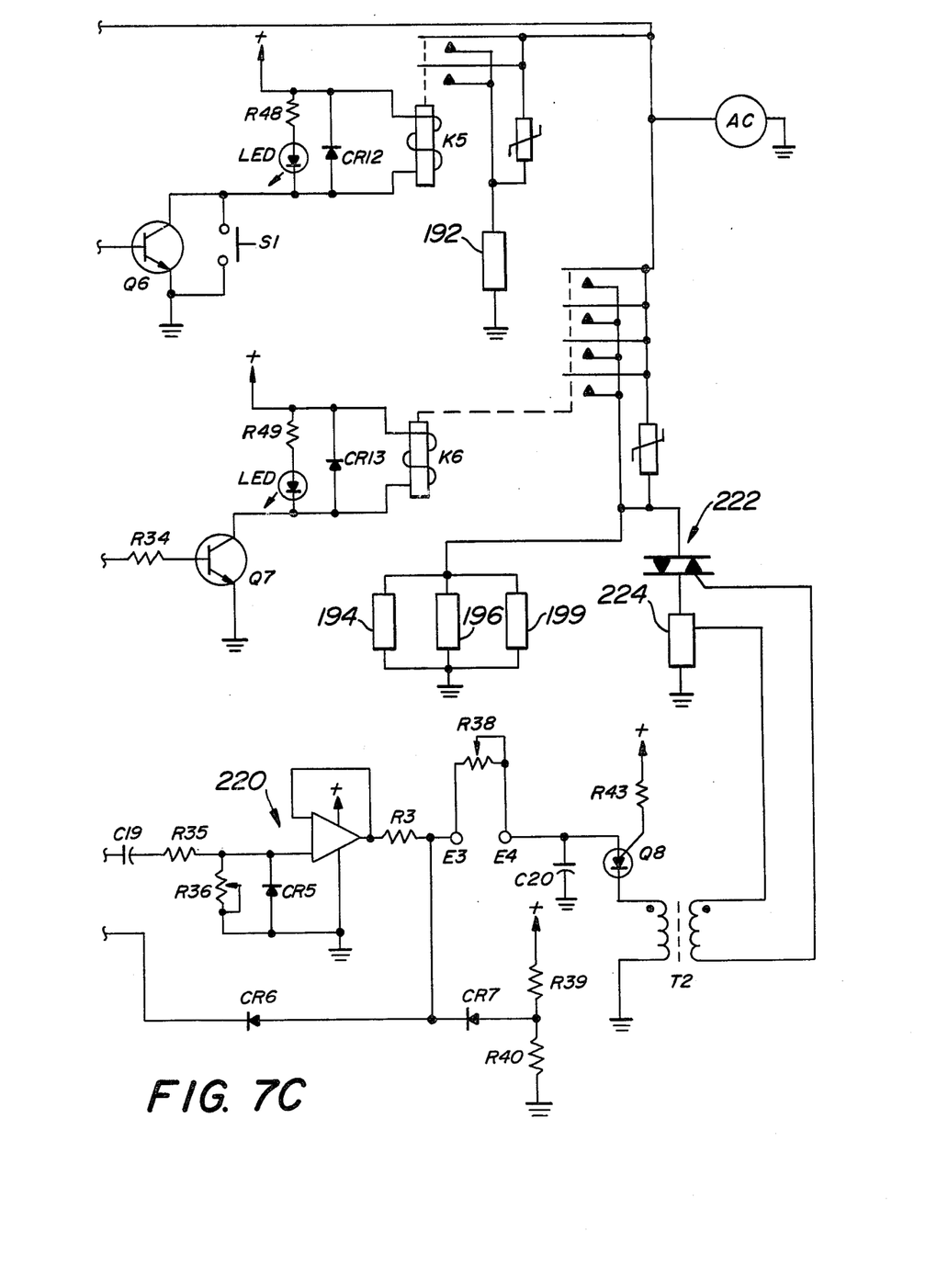

The foregoing operations occur automatically after reception of a coin. The timing and control for the operations are provided by the electronic timing and control unit 44. See FIG. 7A, 7B and 7C.

When a coin is inserted in receptacle 50 (FIG. 1B), the coin trips a coin mechanism switch 174. The switch disables a NAND gate 176 which in turn enables a NAND gate 178. The NAND gate 178 is also enabled by a positive supply voltage via resistors R8, R9. As long as NAND gate 178 is enabled, it maintains NAND gate 176 disabled.

The output of NAND gate 178 triggers one shots 180 and 182. At the same time, the output of NAND gate 176 releases the reset on an astable multivibrator 184 and turns on a transistor Q2. The transistor Q2 actuates a relay K1 so that the relay contacts close to transmit ac from a conventional outlet to a coin mechanism lockout device 186. The lock-out device prevents operation of unit 44 in response to a further coin until the machine cycle is completed.

The astable multivibrator 184 gates a triac 188 so that the as signal flashes a light 190 on and off during the machine cycle. The light 190 may be located on the machine door 48, exposed to view by the customer.

When triggered, the one shot 180 generates a six second (approximately) output pulse which is transmitted via resistor R33 to the base of transistor Q6. The output pulse turns the transistor Q6 on. During this time, the transistor operates relay K5, and the relay contacts close to transmit ac to a sugar motor 192. The sugar motor 192 operates the sugar dispenser (not shown) causing the dispenser to dump a charge of sugar through the chute 28 to the rotary head 26.

A manual pre-fill push button switch S1 is connected across the collector and emitter of transistor Q6 to pre-fill the head 26 with sugar before reception of a coin, i.e., before the first machine cycle. When the switch is depressed, the sugar motor is operated to cause a charge of sugar to be dispensed to the head. Thus, the head 26 is pre-filled with sugar before it begins to rotate during a machine cycle. As the head rotates during a machine cycle, it spins out floss while sugar in the head is replenished due to operation of transistor Q6. If the head is empty when it first begins to rotate, undesirable vibrations may be encountered.

When triggered, the one shot 182 generates a two second (approximately) pulse which is transmitted by diode CR3 and resistor R34 to the base of transistor Q7. The pulse maintains the transistor Q7 on. The transistor Q7 operates the relay K6, causing the relay contacts to close to transmit ac to a motor 194 for rotating the rotary head 26, a motor 196 (in the drive 24) for rotating the collar and sleeve arrangement 22, and a motor 199 for driving the rotary drum 34 which surrounds head 26. Accordingly, at the rising edge of the pulse output of one shot 182, motor 194 starts to rotate the head 26 to spin out floss; motor 196 starts to rotate collar and sleeve arrangement 22 to rotate the stick 18 about its own axis; and motor 199 starts to rotate the drum 34 so that floss spun out by head 26 is deflected and swept towards the rotating stick 18.

The trailing edge of the pulse produced by one shot 182 triggers a one shot 198. The one shot 198 generates a variable duration pulse which activates the heater element in head 26. The heater element provides enough heat to melt the sugar and enable the head to spin out floss. The duration of the pulse produced by one shot 198 determines the length of the heating cycle, hence the total amount of heat supplied to head 26. The duration of the pulse depends on the initial head temperature as described more fully hereinafter.

The pulse output of one shot 198 is transmitted by diode CR4 and resistor R34 to the base of transistor Q7 to keep the transistor on and the motors 194, 196 and 199 rotating. At the trailing edge of the pulse, current to the heater element in head 26 is cut off. The trailing edge of the pulse also triggers a ("run-off" time) one shot 200 which produces a four second (approximately) output pulse. This pulse is transmitted by diode CR2 and resistor R34 to transistor Q7, keeping the transistor on for the pulse duration. Thus, the motors 194, 196 and 199 continue to drive the head 26, collar and sleeve arrangement 22 and drum 34, respectively, while the heater element is maintained off. This four second interval of time is termed the "run-off" time. During the "run-off" time, the head 26 continues to spin out floss, the drum 34 continues to deflect and sweep the floss towards the stick 18, and the stick 18 is maintained in position and continues to turn about its own axis to collect the floss. This prevents the floss from accumulating on the interior wall of the drum 34 after the heat supply has been cut off.

At the end of the "run-off" interval of time, the transistor Q7 turns off, and the motors 194, 196 and 199 stop driving the head 26, collar and sleeve arrangement 22 and drum 34. At the same time, the trailing edge of the pulse produced by one shot 200 triggers one shots 202 and 204. See FIG. 7A. The one shot 202 generates a four second (approximately) pulse which is transmitted by resistor R17 to the base of transistor Q5. The pulse turns transistor Q5 on. The transistor Q5 operates relay K4, causing the relay contacts to close, which transmits ac to the plunger motor 118. When one shot 204 is triggered, it generates a 4.5 second (approximately) pulse which is transmitted by resistor R14 to the base of transistor Q4. The pulse turns the transistor Q4 on. The transistor Q4 operates the relay K3, causing the relay contacts to close, which transmits ac to the roller drive motor 144. The motor 144 starts to drive the roller 140. The plunger motor 118 and roller motor 144 are therefore operated together when the motor 196 is off, that is, when the collar and sleeve arrangement 22 is stopped.

The length of the pulse produced by one shot 204 is preselected so that the entire stick passes through rollers 140, 142, i.e., that a stick will be in position in collar 156 at the start of a machine cycle, before the roller motor is turned off. The switch 205 is connected across the transistor Q4 to ensure that a stick is always in position in the collar 156 at the start of a machine cycle should the length of the pulse produced by one shot 204 prove inadequate for this purpose. See FIG. 7A. The switch is activated by a stick as the stick reaches the nip of rollers 140, 142. See FIG. 2B. The switch is mounted on wall 84 and has a lever arm which extends within the path of the stick as it enters the nip between rollers 140, 142. Normally, switch 205 is open. When the stick enters the nip between rollers 140, 142 it deflects the lever arm and closes the switch. When the switch is closed, it activates relay K3 and roller motor 144. If for any reason the stick should not be released by rollers 140, 142 when one shot 204 times out, the switch 205 keeps motor 144 on. Accordingly, the motor continues to drive roller 140. The roller is continuously driven until the stick releases the switch arm.

During the pulse produced by one shot 202, the plunger motor 118 operates the plunger mechanism 114 to eject a new stick from the storage facility 16 towards the roller arrangement 20. The roller motor 144 is on at this time, and the new stick is driven by the roller 140 towards the idle collar and sleeve arrangement 22. When the new stick is received at the collar and sleeve arrangement 22, the stick enters the collar and sleeve arrangement and is forced downwardly through the collar opening, the collar and sleeve not yet being driven. As previously indicated, the pulse output of the one shot 204 is calculated to keep roller motor 144 on for the particular period of time required to move the entire stick through rollers 140, 142. Throughout this time, motor 144 drives roller 140, and the collar and sleeve remain idle. Thus, the unit 44 controls the timing and sequence of operation of the roller motor 144 and the collar and sleeve drive motor 196 so that both motors are not on at the same time. This eliminates any twisting of a stick as it is driven in contact by the roller 140 through the collar and sleeve arrangement.

The length of the pulse produced by one shot 202 is preselected so that the lever 128 returns to the initial fully retracted position at the end of a revolution of shaft 122. If for any reason the pulse proves inadequate for this purpose the limit switch 206 is provided to keep the plunger motor 118 on until the lever 128 returns to the initial position.

More specifically, when the plunger motor 118 is actuated by the pulse output of one shot 202, the plunger motor rotates shaft 122 to cause the plunger 134 to contact a new stick and move the stick downwardly out of the storage facility 16. This occurs during the first half revolution of the shaft 122. During the second half revolution of the shaft 122, the plunger 134 is retracted upwardly. The second half cycle of revolution ends when the lever 128 returns to initial position and trips the limit switch 206. See FIGS. 7A and 7B.

Before the plunger motor 118 is operated, the limit switch 206 is open. When the plunger motor 118 is turned on by transistor Q5, lever 128 releases limit switch 206 and the switch closes. During the first half revolution of the shaft 122, the limit switch 206 remains closed. When transistor Q5 is turned off and the limit switch is tripped (opened) by the lever 128 during the second half revolution of shaft 122, plunger motor 118 turns off.

Assuming that the speed of the shaft 122 is fifteen rpm, the limit switch 206 should open to cut off the plunger motor 118 after four seconds. The roller motor 144, however, continues to drive the roller 140 for an additional half second before the drive motor 196 starts rotating the collar and sleeve. This insures that the new stick will be driven fully out of the roller arrangement 20 and received by the collar and sleeve arrangement 22, without any twisting of the stick before the collar and sleeve arrangement is rotated. The stick originally positioned in the collar and sleeve arrangement is displaced by the new stick and drops downwardly into the basket 38.

The trailing edge of the 4.5 (approximately) second pulse generated by one shot 204 temporarily disables a NAND gate 208. The NAND gate 208 enables a NAND gate 210 and turns the transistor Q3 on. See FIG. 7A. The transistor Q3 operates a relay K2, closing the relay contacts, which transmits ac to a buzzer 212 and light 214. The buzzer 212 may be mounted on the inside of the machine door 48. Light 214 is mounted on the underside of strut 59 within the machine to illuminate basket 39. See FIG. 1A. The buzzer 212 and light 214 are operated for a short interval of time determined by the time constant of capacitor C30 and resistors R7 and R40.

If desired, a switch 216 may be mounted on the door 48 to detect closure of the door. The switch 216 is open when the door is closed and closed when the door is open. Thus, should the door be opened for any reason, the switch 216 closes to disable the NAND gate 208, causing transistor Q3 to go on. This energizes the buzzer 212 and light 214 which provides a warning until the door is closed.

Preferably, a switch 218 is mounted on the door 48 in a position to be operated by the vertically reciprocable door gate 52. The gate 52 is made of a transparent material so that the customer can see the stick and floss deposited in the basket 39 at the completion of a machine cycle. The customer lifts the gate to obtain access to the stick and floss. When the gate is lifted, the gate trips the switch 218, closing the switch. The switch 218 is connected across the collector and emitter of a transistor Q1. See FIG. 7B. The collector of the transistor Q1 drops in voltage towards ground, thereby resetting one shots 180, 182, 198 and 200 in preparation for the next machine cycle. When switch 218 is closed, it also disables NAND gates 178 and 210. See FIG. 7A. NAND gate 178 enables NAND gate 176, thereby resetting astable multi-vibrator 184 (turning off light 190) and turning off transistor Q2 (disabling lock-out device 186). When the gate 52 is dropped, switch 218 opens. Transistor Q1 turns on, and the collector of the transistor rises in voltage. This releases the reset of the one shots 180, 182, 198 and 200.

If desired, a motor driven music mechanism 187 of conventional type may be connected across the lock-out device 186 to provide a musical sound during operation of the machine. See FIG. 7A.

A switch 111 is mounted on the wall 84 to detect depletion of the sticks stored in storage facility 16. See FIG. 2B. The switch is activated by an extension 109 of rib 106 (see FIG. 3) which contacts the lever arm of switch 111 when no sticks remain in the storage facility 16. The switch 111 may be a SPDT switch which is connected to enable the lock-out device 186 and energize a warning lamp when activated by extension 109.

CONTROL OF THE HEATER ELEMENT

At the start of the heat cycle, the pulse output of one shot 198 reverse biases diode CR6. See FIGS. 7B and 7C. The voltage at junction E3 rises towards a predetermined level set by voltage divider R39, R40. At the same time, the voltage at the output of amplifier 220 changes in response to the pulse output of one shot 198. The capacitor C20 charges to the combined voltage at junction E3. As the capacitor C20 charges, it operates the unijunction transistor Q8 and then discharges. Thus, the unijunction transistor Q8 develops a pulse across the primary of transformer T2. This oscillation is repeated at a rate determined by the output voltage of the amplifier 220.

More specifically, the minimum heat setting potentiometer R38 and the capacitor C20 operate in conjunction with the unijunction transistor Q8 as an oscillator whose frequency depends on the output of amplifier 220. At the beginning of the heat cycle, the voltage at the output of amplifier 220 rises. The amplifier output voltage then decays at a preselected rate determined by the circuit elements. As the amplifier output voltage decays, the frequency of the pulses developed by the oscillator decreases. Accordingly, the secondary of transformer T2 initially turns on the triac 222 repeatedly at a relatively high frequency and, as the amplifier output voltage decreases, at relatively lower frequency. As a result, ac is transmitted to the feeder element 224 more frequently at the beginning of the heat cycle and more sparingly thereafter. The amplifier output voltage decays and eventually levels off at a voltage which corresponds to the minimum heat setting. The oscillator therefore develops relatively constant frequency pulses which energize the heater element to maintain the head at the minimum heat setting. This setting is suitable for optimum working conditions of the machine.

At the end of the heat cycle, the pulse produced by one shot 198 goes low, forward biasing diode CR6. The voltage at junction E3 is therefore clamped low preventing the oscillator from generating further pulses at the primary of transformer T2. The duration of the heat cycle is determined by the heat sensor 224, amplifier 226 and the one shot 198. The heat sensor 224 is disposed near head 26. The sensor 224 senses the initial temperature of the head, i.e., the temperature of the head at the beginning of the heat cycle. The amplifier 226 develops an output voltage in response to the resistance of sensor 224. This output voltage is transmitted via potentiometer R23 and capacitor C7 to the one shot 198 and determines the duration of the pulse produced by the one shot 198. For higher initial temtemperatures of the head 26, the pulse (length of heat cycle) produced by one shot 198 is shorter. For lower initial temperatures of the head, the pulse (length of heat cycle) produced by the one shot is longer.

Figure 8:
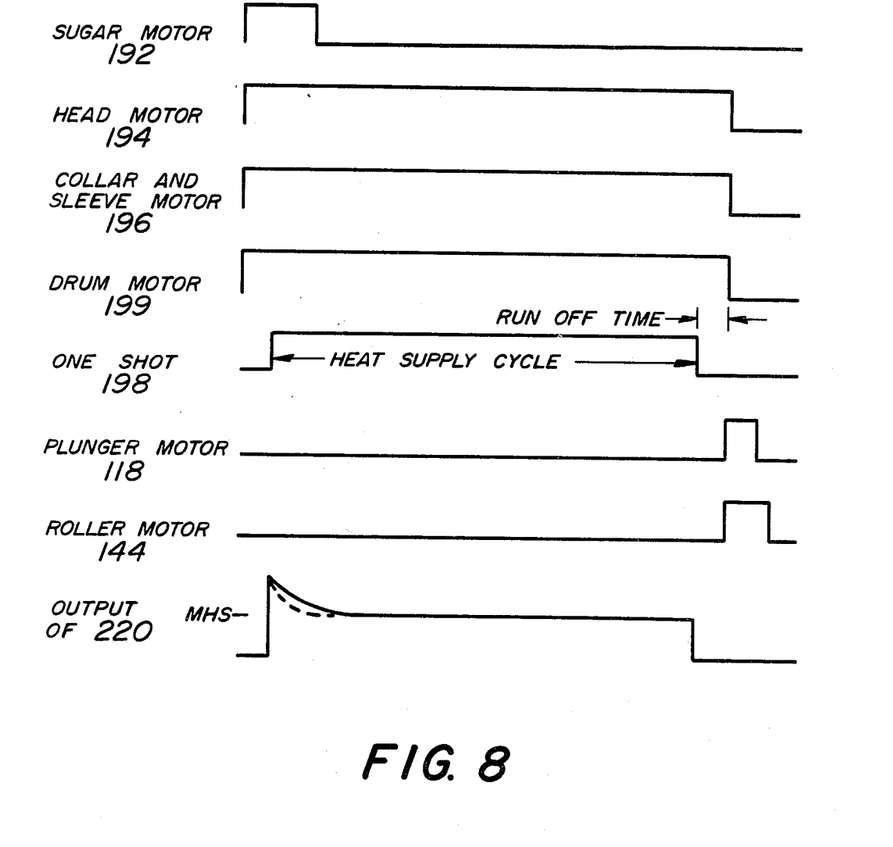
FIG. 8 is a voltage and timing diagram.

If desired, the rate of decay of the output voltage of amplifier 220 can be varied by adjustment of variable resistance 36 in the amplifier input circuit. Thus, the rate at which the heat supplied by the heater element decays towards a predetermined minimum heat setting can be increased or decreased by appropriate setting of the variable resistance prior to the heat cycle. This effect is indicated by the dotted portion of the voltage developed at the amplifier output. See FIG. 8.

The present invention may be embodied in other specific forms without departing from the spirit or essential attributes thereof and, accordingly, reference should be made to the appended claims, rather than to the foregoing specification, as indicating the scope of the invention.

I claim:

1. In a candy floss machine for dispensing candy floss on a stick including a rotary head for producing the floss, and means for automatically dispensing stored sticks at least one stick at a time to a location spaced from the rotary head at which the floss is collected, the combination comprising:
    an annular storage facility in which one or more of said sticks may be stored,
    said storage facility having an opening at a preselected location through which a stick may be ejected,
    means for urging said one or more sticks towards said preselected location in said storage facility to cause said one or more sticks to enter into alignment with said opening at said preselected location,
    means for retaining said stick in alignment with said opening at said preselected location in said storage facility in preparation for dispensing the stick.

2. In a candy floss machine for dispensing candy floss on a stick including a rotary head for producing the floss, a storage facility for storing one or more sticks, and means for automatically dispensing the stored sticks at least one stick at a time to a location spaced from the rotary head at which the floss is collected, the combination comprising:
    stick receiving means spaced apart from said storage facility,
    said stick receiving means having an opening for receiving a stick dispensed from said storage facility, driving means interposed between said storage facility and said stick receiving means for driving said dispensed stick towards said stick receiving means, means for automatically aligning said driven stick with said stick receiving means opening to cause said stick to enter said opening, means for causing rotation of said stick receiving means after said stick has entered said opening, whereby said stick is caused to rotate about its own axis within said stick receiving means to collect the floss.

3. The combination according to claim 2 wherein said means for causing rotation of said stick includes means for preventing simultaneous operation of said driving means and said stick receiving means to prevent twisting of said stick.

4. In a candy floss machine for dispensing candy floss on a stick including a rotary head for producing the floss, and means for automatically dispensing stored sticks at least one stick at a time to a location spaced from the rotary head at which the floss is collected, the combination comprising:

a rotatable drum provided with a wall, a cover releasably mounted on said drum, said cover having a peripheral flanged portion spaced apart from said wall of said drum, a support for said drum, said support having a peripheral flanged portion spaced apart from said wall of said drum, means for causing relative rotation between said drum and said support, said flanged portions of said cover and support defining an annular storage facility within which one or more of said sticks may be stored, said support having an opening at a preselected location to accomodate passage of at least one of said sticks therethrough, means for urging said one or more sticks along said annular storage facility towards said preselected location during relative rotation between said drum and said support to cause at least one of said sticks to move into alignment with said support opening in preparation for dispensing the stick.

5. The combination according to claim 4 including means for ejecting a stick aligned with said support opening through said support opening.

6. The combination according to claim 5 including means for retaining said stick in alignment with said support opening and for preventing bowing of said stick while said stick is ejected through said support opening.

7. In a candy floss machine for dispensing candy floss on a stick including a rotary head for producing the floss, a storage facility in which one or more sticks may be stored, said storage facility having an opening through which a stick may be ejected, and means for automatically dispensing the stored sticks at least one stick at a time to a location spaced from the rotary head at which the floss is collected, the combination comprising:

a sleeve disposed below said storage facility, said sleeve being mounted for rotation about an axis aligned with said storage facility opening, a collar having an opening for receiving a stick ejected through said storage facility opening, means for causing limited relative rotation between said collar and said sleeve to align said collar opening with said ejected stick to permit said stick to be received in said collar opening, means for causing rotation of said sleeve and collar about said axis after said stick is received in said collar opening, whereby said stick is first aligned and received in said collar opening and then rotated about its own axis to collect the floss.

8. The combination according to claim 7 wherein said means for causing limited relative rotation between said collar and said sleeve includes:

an arcuate slot in said collar, a pin secured to said sleeve and disposed within said arcuate slot.

9. In a candy floss machine for dispensing candy floss on a stick including a rotary head for producing the floss, means for automatically introducing an ingredient in the head from which the floss is produced, a storage facility for storing one or more sticks, means for automatically dispensing the stored sticks at least one stick at a time to a location spaced from the rotary head, means for rotating a dispensed stick about its own axis at said location to collect the floss, and a drum surrounding the head for sweeping floss towards the stick, the combination comprising:

means for applying heat to the head during a first interval of time, means for causing said head to rotate during said first interval of time while heat is applied to the head to cause said head to produce said floss.

means for causing the head to continue to rotate for a second preselected interval of time following said first interval of time while heat is not applied to the head and for causing said head to stop rotating after said second preselected interval of time has ended, means for causing said rotating means to continue to rotate said stick at said location during both said first and second intervals of time, whereby said head continues to produce said floss during said second interval of time and said floss is collected by said stick without accumulating on said drum while heat is not applied to said head.

10. The combination according to claim 9 including means for introducing said ingredient in said head before said head is caused to rotate.

11. In a candy floss machine for dispensing candy floss on a stick including a rotary head for producing the floss, a storage facility for storing one or more sticks, means for automatically dispensing the stored sticks at least one stick at a time to a location spaced from the rotary head, means for rotating a dispensed stick about its own axis at said location to collect the floss, and a drum surrounding the head for sweeping floss towards the stick, the combination comprising:

means for sensing the initial temperature of said rotary head, means for applying an amount of heat to the head during a period of time having a variable length based on the initial temperature of the head.

12. The combination according to claim 11 including:

means for varying the temperature of said head during a first portion of said variable period of time, and means for maintaining the temperature of said head at at a predetermined level during the remaining portion of said variable period of time.

13. The combination according to claim 11 wherein said predetermined temperature level is adjustable.

14. The combination according to claim 12 wherein said means for varying the temperature of said head during said first portion of said variable period of time includes means for automatically increasing the head temperature and then decreasing the head temperature at a preselected rate towards said predetermined temperature level.

15. The combination according to claim 14 wherein said preselected rate of decrease of the head temperature is adjustable.

* * * * *